United States Patent
Al Otaibi et al.

(10) Patent No.: US 12,345,140 B1
(45) Date of Patent: Jul. 1, 2025

(54) ADVANCED WATERFLOODING METHODS FOR ENHANCED HYDROCARBON RECOVERY

(71) Applicant: SAUDI ARABIAN OIL COMPANY, Dhahran (SA)

(72) Inventors: Mohammed Badri Al Otaibi, Dhahran (SA); Dong Kyu Cha, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/443,563

(22) Filed: Feb. 16, 2024

(51) Int. Cl.
  *E21B 43/20* (2006.01)
  *C02F 1/26* (2023.01)
  *C02F 1/44* (2023.01)
  *E21B 34/14* (2006.01)
  *C02F 103/08* (2006.01)

(52) U.S. Cl.
  CPC .............. *E21B 43/20* (2013.01); *C02F 1/265* (2013.01); *C02F 1/441* (2013.01); *C02F 2103/08* (2013.01); *C02F 2209/005* (2013.01); *C02F 2209/05* (2013.01); *C02F 2209/10* (2013.01)

(58) Field of Classification Search
  CPC ............ E21B 43/20; E21B 34/14; C09K 8/34
  USPC ......................................................... 166/275
  See application file for complete search history.

(56) References Cited

U.S. PATENT DOCUMENTS

| | | | |
|---|---|---|---|
| 7,726,398 B2 * | 6/2010 | Collins | E21B 43/20 166/266 |
| 7,789,159 B1 * | 9/2010 | Bader | C02F 9/00 166/371 |
| 9,540,574 B2 * | 1/2017 | Janssen | E21B 43/34 |
| 2017/0089178 A1 * | 3/2017 | Schmidt | C02F 1/441 |
| 2019/0300410 A1 * | 10/2019 | Katz | B01D 61/025 |
| 2020/0399145 A1 | 12/2020 | Janson et al. | |
| 2023/0237227 A1 | 7/2023 | Thakur et al. | |

FOREIGN PATENT DOCUMENTS

CN          111663926 A          9/2020

OTHER PUBLICATIONS

Mobile Reverse Osmosis Systems, Evoqua Water Technologies; retrieved from https://www.wateronline.com/doc/mobile-reverse-osmosis-ro-0002.
Wikipedia contributors, "Reverse osmosis," Wikipedia, The Free Encyclopedia, https://en.wikipedia.org/w/index.php?title=Reverse_osmosis&oldid=1200006714 (accessed Feb. 15, 2024).

(Continued)

*Primary Examiner* — Zakiya W Bates
*Assistant Examiner* — Ashish K Varma
(74) *Attorney, Agent, or Firm* — Vorys, Sater, Seymour and Pease LLP

(57) ABSTRACT

Enhanced hydrocarbon recovery methods may utilize aqueous flooding. For example, such aqueous flooding methods may include: desalinating, at least partially, a first portion of a saline aqueous fluid through a reverse osmosis system to produce a desalinated aqueous fluid; mixing the desalinated aqueous fluid with a second portion of the saline aqueous fluid at a first ratio to produce an aqueous flooding fluid; and introducing the aqueous flooding fluid to a subterranean reservoir.

20 Claims, 4 Drawing Sheets

(56) References Cited

OTHER PUBLICATIONS

Samir El-Manharawy, Azza Hafez, Water type and guidelines for RO system design, Desalination, vol. 139, Issues 1-3, 2001, pp. 97-113.

Sonnek, Modular plants for enhanced oil recovery; retrieved from https://sonnek.com/en/systems/modular-plants-for-enhanced-oil-recovery/.

Lenntech, Water Technologies & Solutions, Water for the World; retrieved from https://www.lenntech.com/Data-sheets/GE-SUEZ-Product-Catalog-L.pdf.

Wu, Fan & Hou, Jirui & Wang, Zhiming & Ma, Yunfei & Wang, Dongying. (2018). An enhanced oil recovery technique by targeted delivery ASP flooding. Petroleum Exploration and Development. 45. 321-327.

Muhammad Ali Buriro, Mingzhen Wei, Baojun Bai, Ya Yao, Advances in smart water flooding: A comprehensive study on the interplay of ions, salinity in carbonate reservoirs, Journal of Molecular Liquids, vol. 390, Part B, 2023.

\* cited by examiner

ADVANCED WATERFLOODING METHODS FOR ENHANCED HYDROCARBON RECOVERY

FIELD OF THE DISCLOSURE

The present disclosure relates generally to methods and systems for enhanced hydrocarbon recovery and, more particularly, enhanced hydrocarbon recovery methods and systems utilizing aqueous flooding.

BACKGROUND OF THE DISCLOSURE

Enhanced hydrocarbon recovery (e.g., enhanced oil recovery, EOR) refers to methods and systems that introduce fluids through an injection well to a downhole location to encourage release of the hydrocarbons within a reservoir and mobilization of the hydrocarbons toward a production well. The enhanced hydrocarbon recovery processes used in conventional oil and gas operations may include water, chemical, hydrochemical, thermal, fluid/superfluid, and microbial based processes. The injected fluids in an operation may promote release and mobilization of hydrocarbons through a variety of mechanisms including oil swelling, viscosity reduction, and wettability alteration, for example.

Water injection (alternatively referred to as water flooding or aqueous fluid flooding) has been widely used to increase the conductivity or flow of liquid hydrocarbons in a subterranean reservoir treated using EOR techniques. The water sources for water injection may be derived from freshwater sources (for example, aquifers or surface water), saltwater/brackish sources (for example, river/sea water mixtures), as well as wastewater from oil fields (for example produced water/other treated water effluents).

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure includes: desalinating, at least partially, a first portion of a saline aqueous fluid through a reverse osmosis system to produce a desalinated aqueous fluid; mixing the desalinated aqueous fluid with a second portion of the saline aqueous fluid at a first ratio to produce an aqueous flooding fluid; and introducing the aqueous flooding fluid to a subterranean reservoir.

A first nonlimiting example system of the present disclosure includes: an inline mixer; a reverse osmosis unit fluidly connected to the inline mixer, wherein the reverse osmosis unit produces desalinated aqueous fluid from saline aqueous fluid, and wherein the inline mixer combines the desalinated aqueous fluid and the saline aqueous fluid at a first ratio to produced aqueous flooding fluid; a first injection well fluidly connected to the inline mixer, wherein the first injection well introduces a first portion of the aqueous flooding fluid to a subterranean reservoir; a first TDS sensor, wherein the first TDS sensor measures a first salinity of the desalinated aqueous fluid, and wherein the first TDS sensor is in communication with a controller; a second TDS sensor, wherein the second TDS sensor measures a second salinity of the saline aqueous fluid, and wherein the second TDS sensor is in communication with the controller; a fourth TDS sensor, wherein the fourth TDS sensor measures an online salinity of the aqueous flooding fluid, and wherein the fourth TDS sensor is in communication with the controller; a first inflow choke valve, wherein the first inflow choke valve is configured to regulate a flow of the desalinated aqueous fluid to the inline mixer, and wherein the first inflow choke valve is in communication with the controller; and a second inflow choke valve, wherein the second inflow choke valve is configured to regulate a flow of the saline aqueous fluid to the inline mixer, and wherein the second inflow choke valve is in communication with the controller.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
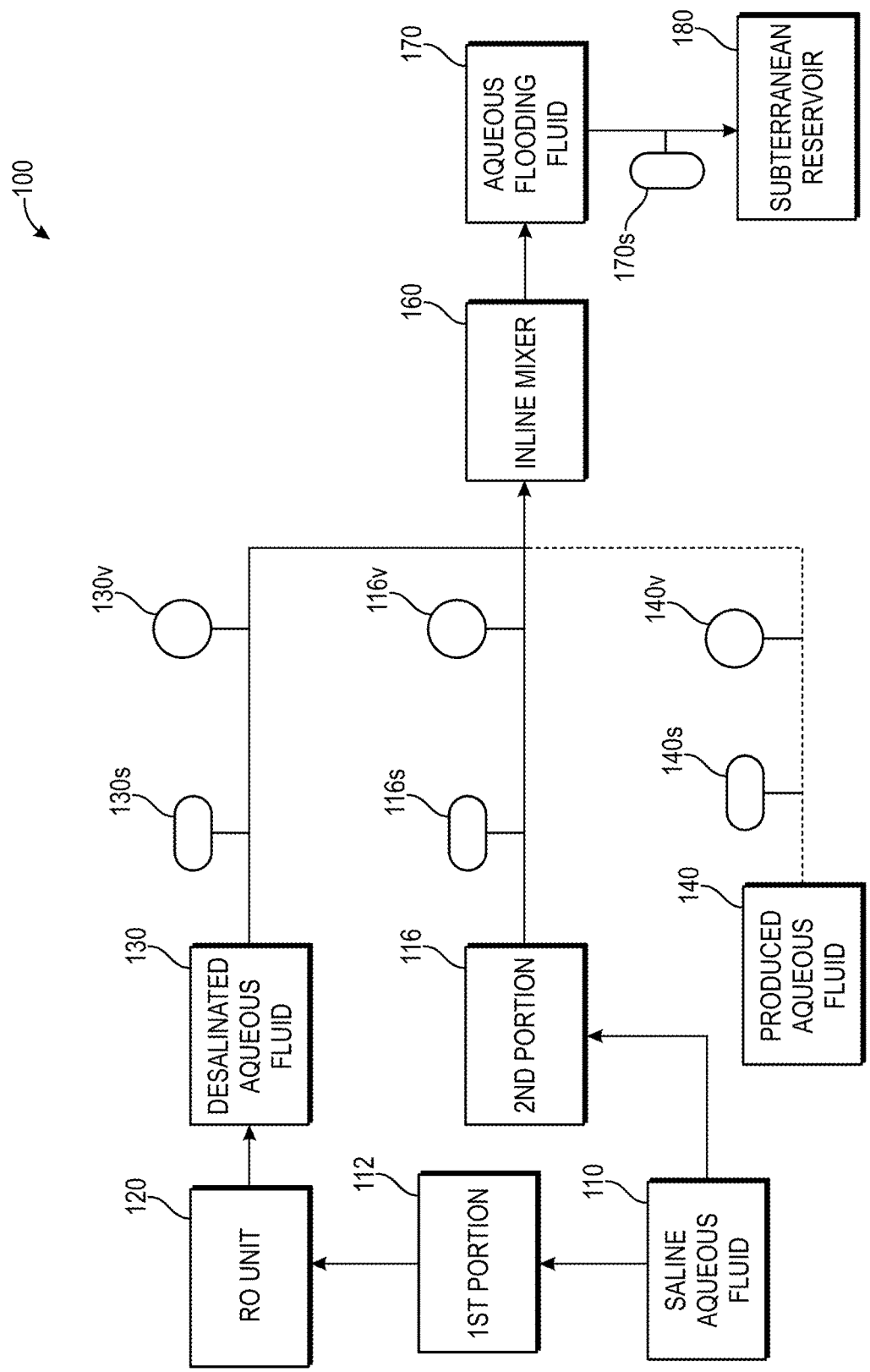
FIG. 1 is a diagram of a nonlimiting example system according to the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates generally to methods and systems for enhanced hydrocarbon recovery and, more particularly, enhanced hydrocarbon recovery methods and systems utilizing aqueous flooding.

There is increasing interest in systems and methods for production and introduction of aqueous fluids to subterranean reservoirs to promote hydrocarbon mobilization for enhanced hydrocarbon recovery. Methods of the present disclosure may allow for integrated production and introduction to a subterranean reservoir of an aqueous fluid to promote enhanced hydrocarbon recovery with increased targeting and more effective mobilization of hydrocarbons within the subterranean reservoir, as compared to conventional aqueous flooding, or other alternative fluids for encouraging hydrocarbon mobilization. Furthermore, the integrated nature of systems and methods of the present disclosure may allow for optimization of contents of aqueous fluids introduced to a subterranean reservoir, while reducing waste and increasing overall resource and energy efficiency.

Aqueous flooding fluids of the present disclosure may be introduced to the subterranean reservoir through one or more injection wells, targeting delivery to one or more zones of interest. Such targeted delivery may be enabled through optimized delivery of aqueous flooding fluid to one or more injection wells, such that the configuration of the one or more injection wells directly promotes hydrocarbon mobilization. The present disclosure may enable hydrocarbon mobilization for a specific targeted region comprising specific wells within a hydrocarbon well field. Hydrocarbon mobilization toward a production well may occur due to stimulation of the subterranean reservoir, due to the introduction of aqueous flooding fluid, in various portions (e.g., depths, areas, zones) of the subterranean reservoir. In non-limiting examples, mobilization of hydrocarbons may occur through physical stimulation (toward a production well) of hydrocarbons (within one or more zones of interest) within the subterranean reservoir. Suitable subterranean reservoirs in accordance with the present disclosure may include any subterranean reservoir, preferably a carbonate reservoir.

Methods and systems of the present disclosure may include producing desalinated aqueous fluid through a reverse osmosis process and combining the desalinated aqueous fluid with saline aqueous fluid and, optionally, produced aqueous fluid to tailor an optimized aqueous flooding fluid for introduction to a subterranean reservoir. In particular, methods and systems of the present disclosure may include optimized introduction of aqueous flooding fluid with a particular composition and flow, based on one or more reservoir factors. Such optimized introduction may occur through use of control systems including composition sensors (e.g., total dissolved solids sensors) and/or valves (e.g., choke valves) to regulate the combination of constituent fluids of the aqueous flooding fluid as well as the flow of aqueous flooding fluid. Such control systems may be enabled through computational control methods and systems, including methods capable of control based on the one or more reservoir factors.

The one or more reservoir factors of the present disclosure may include mineralogical content, temperature, pressure, formation wettability, minimum fracture pressure, formation layers, the like, or any combination thereof. Such reservoir factors may be used by a controller in addition to composition sensor data to calculate optimized composition and optimized flow of aqueous flooding fluid for introduction to the subterranean reservoir.

The aqueous flooding fluid may comprise an aqueous fluid including total dissolved solids (TDS) of about 6,000 ppm to about 10,000 ppm, or about 2,000 ppm to about 10,000 ppm, or about 6,000 ppm to about 8,000 ppm, or about 10,000 ppm or less. The aqueous flooding fluid may be derived from a combination of the saline aqueous fluid and the desalinated aqueous fluid in a suitable volumetric mixing ratio (e.g., a first ratio), wherein such a ratio is defined as the ratio of volume of saline aqueous fluid to volume of desalinated aqueous fluid mixed to form aqueous flooding fluid. Such a mixing ratio may be determined by positions of choke valves controlling the flow of saline aqueous fluid and desalinated aqueous fluid, respectively, for combination to form aqueous flooding and thus such a mixing ratio may be calculated and regulated by a controller in accordance with the present disclosure. Additionally, the aqueous flooding fluid may optionally be derived from produced aqueous fluid in a suitable volumetric mixing ratio (e.g., a second ratio), wherein the ratio is defined as the ratio of volume of produced aqueous fluid to the combined volume of saline aqueous fluid and desalinated aqueous fluid mixed to form aqueous flooding fluid. Any of the ratios of combination for producing the aqueous flooding fluid, and thus the concentration of TDS in the aqueous flooding fluid, may be based on one or more reservoir factors (e.g., mineralogical content, oil properties, the like), as described herein.

The saline aqueous fluid of the present disclosure may comprise an aqueous fluid including total dissolved solids (TDS) of about 10,000 ppm to about 30,000 ppm, or about 5,000 ppm to about 20,000 ppm, or about 20,000 ppm to about 30,000 ppm, or about 30,000 ppm or greater. The saline aqueous fluid may be a concentrate rich in various salt ions. The saline aqueous fluid may originate from a suitable natural saline source including, for example, a natural spring, a body of water (e.g., a lake, an ocean, a sea, the like), an industrial output (e.g., wastewater), the like, or any combination thereof. It should be noted that in some embodiments saline aqueous fluid may include reject aqueous fluid from a reverse osmosis process.

The optional produced aqueous fluid of the present disclosure may comprise an aqueous fluid including any suitable concentration of total dissolved solids (TDS). As a nonlimiting example, the optional produced aqueous fluid, if present, may have a TDS from about 100,000 ppm to about 230,000 ppm. It should be noted that the desired TDS concentration of the optional produced aqueous fluid may depend on factors including, but not limited to, the TDS of saline aqueous fluid, the mixing ratios of saline aqueous fluid and desalinated aqueous fluid, the like, or any combination thereof. The produced aqueous fluid may originate from a suitable produced source including, for example, a subterranean reservoir, an industrial output (e.g., wastewater), the like, or any combination thereof.

The desalinated aqueous fluid of the present disclosure may comprise an aqueous fluid including total dissolved solids (TDS) from about 0 ppm to about 10,000 ppm, or about 0 ppm to about 1,000 ppm, or about 0 ppm to about 500 ppm, or about 0 ppm to about 300 ppm, or about 1 ppm to about 10,000 ppm, or about 1 ppm to about 1,000 ppm, or about 1 ppm to about 500 ppm, or about 1 ppm to about 300 ppm, or about 300 ppm or less, or about 500 ppm or less, or about 10,000 ppm or less. The TDS within the desalinated aqueous fluid may be based on factors including, but not limited to the one or more reservoir factors discussed herein.

Fluids of the present disclosure may additionally include any other suitable components suitable for achieving one or more desired functions, provided that the one or more additional components do not adversely affect the flooding function fluids described herein. Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, an iron control agent, the like, or any combination thereof. Suitable examples of the foregoing will be familiar to one having ordinary skill in the art.

Desalinated aqueous fluids of the present disclosure may be produced using reverse osmosis (RO) methods and systems. RO methods and systems of the present disclosure may include any suitable RO means capable of processing a saline aqueous fluid of the present disclosure and producing a desalinated aqueous fluid according to the present disclosure. RO systems of the present disclosure may be mobile RO systems, including RO systems located in whole or in part on a mobile platform. Such a mobile platform may be located on a mobile vehicle and may include, but is not limited to, for example, a trailer, a truck, a shipping container, a ship, a train, the like, or any combination thereof. One of ordinary skill in the art will be able to implement a suitable RO system for use within the present disclosure.

A nonlimiting example RO unit described herein may include production water treatment and may be a zero liquid discharge (ZLD) process. Suitable RO units may include a water treatment apparatus for receiving saline aqueous fluid (e.g., seawater, produced water, the like, or any combination thereof). Such a water treatment apparatus may include a reverse osmosis (RO) unit and a pretreatment unit. In some embodiments, the water treatment apparatus may optionally include additional units including, but not limited to, for example, a carrier gas extraction (CGE) unit, a dynamic vapor recompression (DyVaR) unit, the like, or any combination thereof. The water treatment apparatus may generate desalinated aqueous fluid for use according to the present disclosure as described herein. The desalinated aqueous fluid produced by the water treatment apparatus may include specific concentrations of components optimized for aqueous fluid flooding for enhancing oil recovery in reservoirs (e.g., carbonate reservoirs).

Continuing the nonlimiting example, the RO unit may include a membrane with any suitable pore size, including, but not limited to, for example, a pore size of about 0.001 nanometers (nm) to about 1 nm, or about 0.01 nm to about 0.1 nm, or about 0.01 nm to about 0.05 nm, or about 0.05 nm or less. The RO unit may operate at a rejection efficiency of about 80% to about 99.99%, or about 95% to about 99.99% or about 99% to about 99.99%, or about 99.99% or greater, or about 99% or greater. As used herein, the term "rejection efficiency" refers to the ion rejection efficiency on a concentration basis. The RO reject may be a concentrate rich in various salt ions.

Example embodiments of the present disclosure may include methods and systems whereby aqueous fluids may be produced in an optimized fashion from aqueous fluids including those from RO units. A diagram of a nonlimiting example system for combination of fluids according to methods described herein and introduction to a subterranean reservoir is shown in FIG. 1. System 100 includes wherein saline aqueous fluid 110 is divided into a first portion 112 and a second portion 116, and wherein the first portion 112 is directed to an RO unit 120 in order to produce desalinated aqueous fluid 130. Desalinated aqueous fluid 130, second portion 116, and, optionally, produced aqueous fluid 140 may be combined together and mixed with inline mixer 160 at a mixing ratio (e.g., a first ratio). Prior to combination with inline mixer 160, the desalinated aqueous fluid 130 may have a TDS concentration thereof measured by sensor 130s and may flow through a first inflow choke valve 130v. Prior to combination with inline mixer 160, the second portion 116 may have a TDS concentration thereof measured by sensor 116s and may flow through a second inflow choke valve 116v. Prior to combination with inline mixer 160, the optional produced aqueous fluid 140 may have a TDS concentration thereof measured by sensor 140s and may flow through a third inflow choke valve 140v. Once combined in the inline mixer 160, aqueous flooding fluid 170 may be produced. Subsequently aqueous flooding fluid 170 may have a TDS concentration thereof measured by sensor 170s prior to introduction of the aqueous flooding fluid 170 into subterranean reservoir 180.

Figure 2:
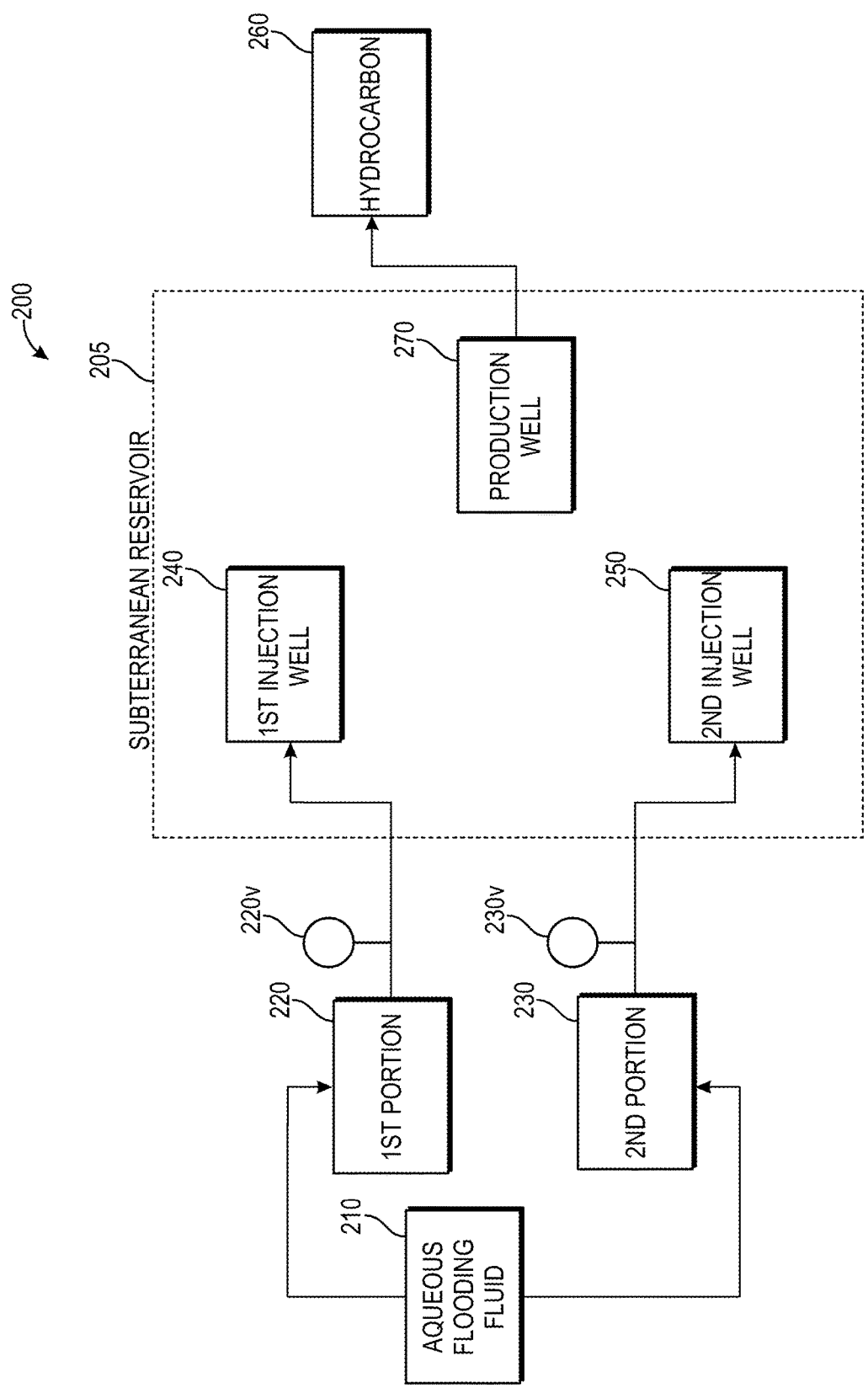
FIG. 2 is a diagram of a nonlimiting example system according to the present disclosure.

Upon being produced, the aqueous flooding fluid may be introduced and utilized within a subterranean reservoir according to methods described herein and according to a nonlimiting example system as shown in FIG. 2. System 200 may include wherein aqueous flooding fluid 210 is introduced to subterranean reservoir 205; a first portion 220 and a second portion 230 of the aqueous flooding fluid are introduced to a first injection well 240 and a second injection well 250, respectively, both wells connected to a subterranean reservoir 205. It should be noted that first portion 220 and second portion 230 may each be introduced through distinct manifolds connected to respective injection wells. Prior to introduction, each portion of aqueous flooding fluid may pass through a first delivery choke valve 220v or a second delivery choke valve 230v, respectively. Upon introduction to the subterranean reservoir 205, the aqueous flooding fluid 210, including first portion 220 and second portion 230 may promote mobilization of a hydrocarbon 260 toward a production well 270, and subsequent extraction of the hydrocarbon 260 from the subterranean reservoir 205. It should be noted that although the aforementioned nonlimiting example describes two (2) each of aqueous flooding fluid portions (220, 230), choke valves (220v, 230v), and injection wells (240, 250), there may be less than two (2) or greater than two (2) of respective portions and components. For example a system or method of the present disclosure may utilize three (3) or more, or five (5) or more, or ten (10) or more of each of the aforementioned aqueous flooding fluid portions, choke valves, injection wells, and the like, for optimally introducing aqueous flooding fluid to a subterranean reservoir. It should additionally be noted that although the aforementioned nonlimiting example describes a production well 270 as one (1) well, more than one (1) production well may be used for extracting hydrocarbons in accordance with the present disclosure.

Figure 3:
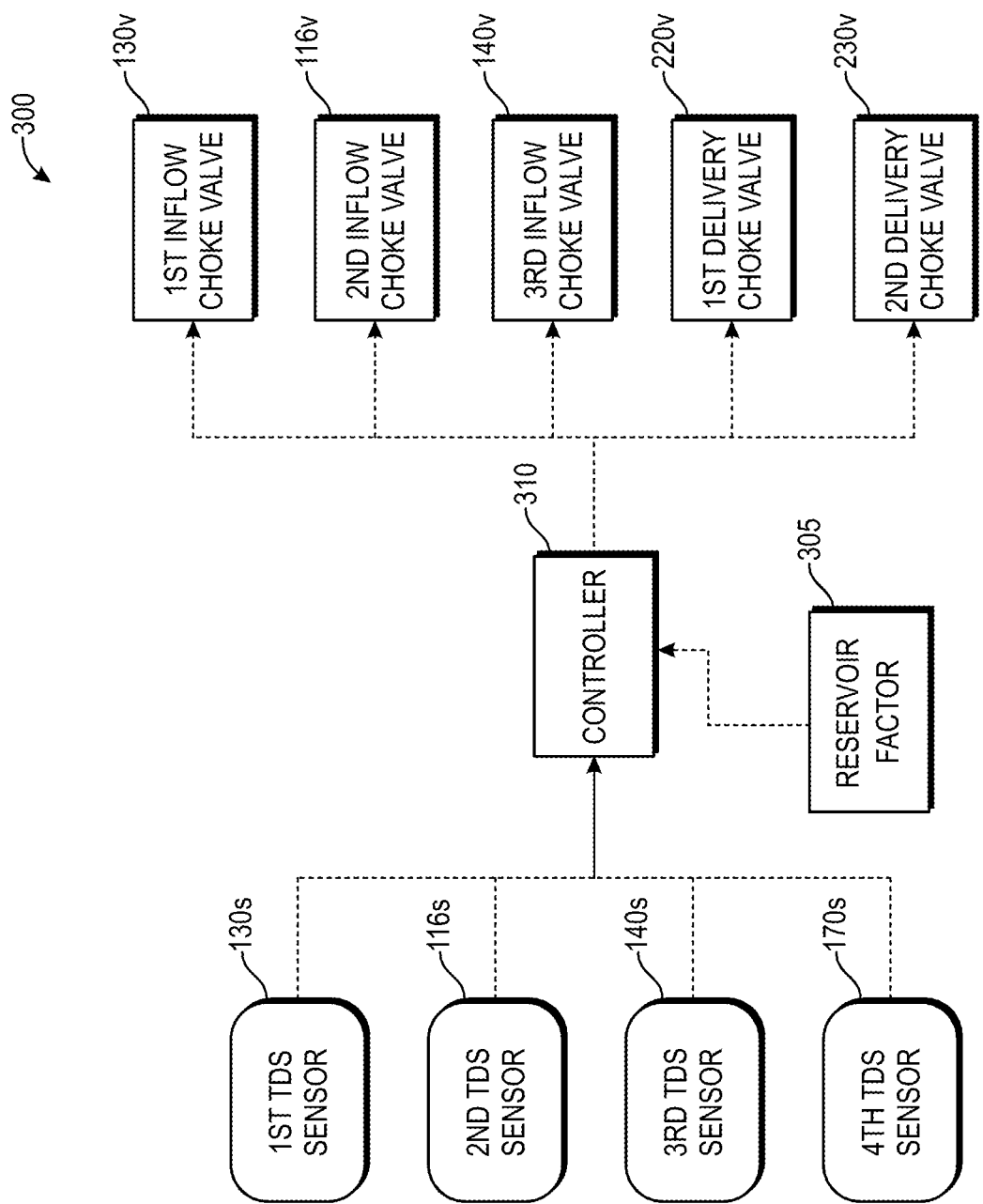
FIG. 3 is a diagram of a nonlimiting example control scheme according to the present disclosure.

With continuing reference to FIG. 1 and FIG. 2, methods and systems of the present disclosure may include a control scheme such as the nonlimiting example control scheme shown in FIG. 3. As shown, control scheme 300 may include wherein a controller 310 inputs signals from various sensors in communication therewith including first TDS sensor 130s, second TDS sensor 116s, third TDS sensor 140s, and fourth TDS sensor 170s. It should be noted that third TDS sensor 140s may be optional. Such input signals may comprise salinity measurements (e.g., a first salinity, a second salinity, an online salinity, and, optionally, a third salinity, of sensors 130s, 116s, 170s, and, optionally, 140s, respectively). Controller 310 may additionally receive one or more reservoir factors 305. Subsequently, controller 305 may calculate positions of one or more choke valves so as to optimize composition and flow of aqueous flooding fluid prior to introduction to a subterranean reservoir, based on received signals regarding sensors and/or reservoir factors. Subsequently, controller 305 may output one or more signals so as to actuate respective choke valve positions to the calculated optimal state. Such choke valves in communication with controller 310 for optimizing composition and flow of aqueous flooding fluids may include first inflow choke valve 130v, second inflow choke valve 116v, and optionally third inflow choke valve 140v, if present. Thus, respective fluids may flow through the first inflow choke valve 130v and second inflow choke valve 116v at a mixing ratio (e.g., a first ratio) based on calculated parameters (e.g., one or more salinity values (e.g., a first salinity, a second salinity, an online salinity, the like), one or more reservoir factors, or any combination thereof) by controller 310. Furthermore, choke valves in communication with controller 310 for optimizing composition and flow of aqueous flooding fluids may include first delivery choke valve 220v and second delivery choke valve 230v. Again, it should be noted that although the aforementioned nonlimiting example control scheme describes two delivery choke valves (220v, 230v), there may be less than two (2) or greater than two (2) of respective portions and components. For example a control scheme of the present disclosure may utilize three (3) or more, or five (5) or more, or ten (10) or more of each of the aforementioned choke valves in communication with a controller 310.

It should be noted that systems for introduction of fluids to a wellbore in conjunction with an operation may comprise a pump fluidly coupled to a tubing (e.g., a manifold), the tubing located at least partially within the wellbore and the tubing containing a fluid for a desired operation. The "pump" described herein may comprise a single pump or may comprise one or more pumps. Given the benefit of the present disclosure, one having ordinary skill in the art will be able to select an appropriate pump or combination of pumps for a given operation.

It should also be noted that additional nonlimiting components may be present in systems suitable to introduce the fluids to a subterranean reservoir and to recover fluids and/or extract hydrocarbons from the subterranean reservoir. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 4. Furthermore, portions of the embodiments may be a computer program product on a computer-readable storage medium having computer-readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods, and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 4:
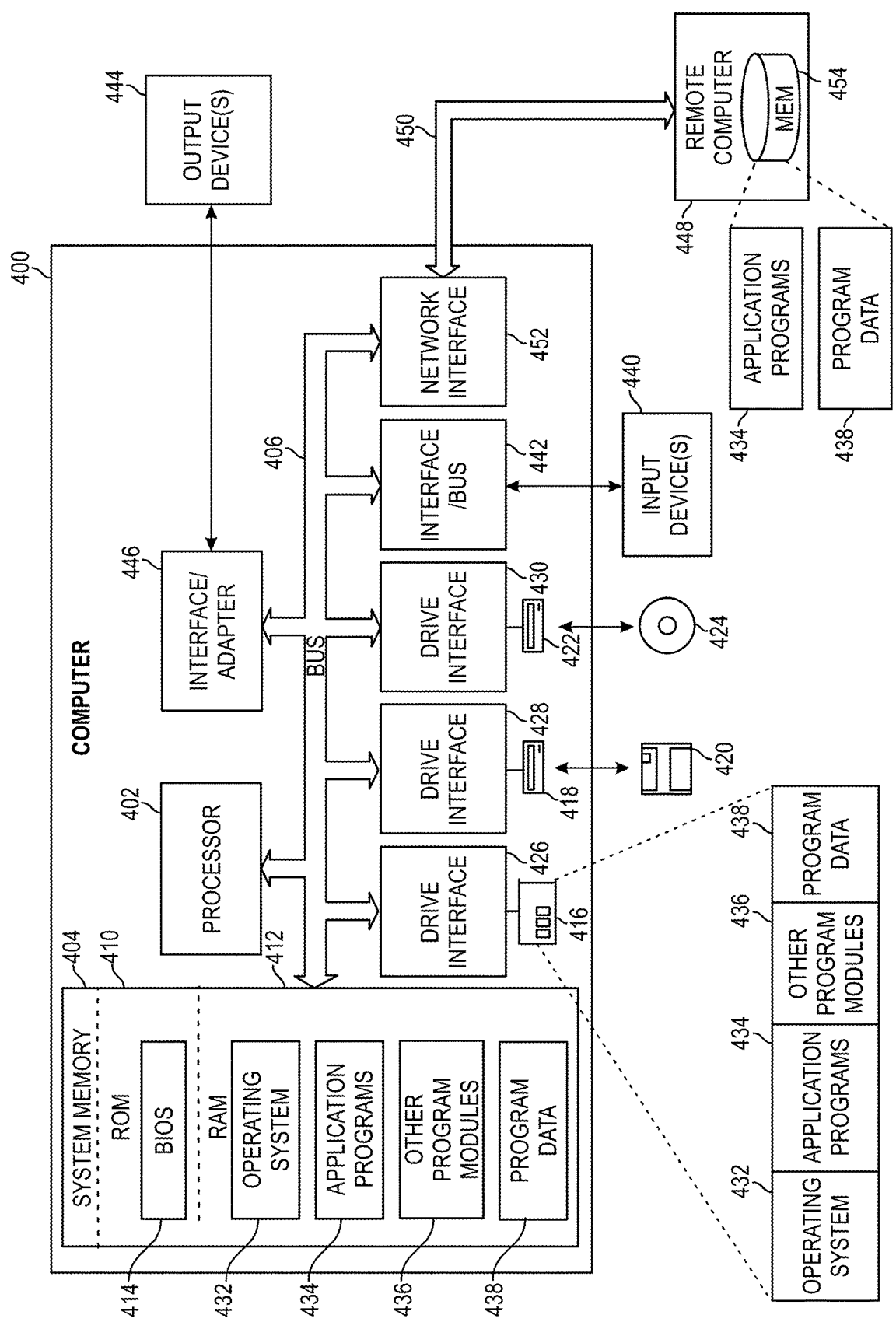
FIG. 4 is a block diagram of a computer system that may be used to implement one or more of the systems or methods described herein in accordance with certain embodiments.

In this regard, FIG. 4 illustrates one example of a computer system 400 that can be employed to execute one or more embodiments of the present disclosure. Computer system 400 can be implemented on one or more general purpose networked computer systems, embedded computer systems, routers, switches, server devices, client devices, various intermediate devices/nodes, or standalone computer systems. Additionally, computer system 400 can be implemented on various mobile clients such as, for example, a personal digital assistant (PDA), laptop computer, pager, and the like, provided it includes sufficient processing capabilities.

Computer system 400 includes processing unit 402, system memory 404, and system bus 406 that couples various system components, including the system memory 404, to processing unit 402. System memory 404 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 402. System bus 406 may be any of several types of bus structure including a memory bus or memory controller, a peripheral bus, and a local bus using any of a variety of bus architectures. System memory 404 includes read only memory (ROM) 410 and random access memory (RAM) 412. A basic input/output system (BIOS) 414 can reside in ROM 410 containing the basic routines that help to transfer information among elements within computer system 400.

Computer system 400 can include a hard disk drive 416, magnetic disk drive 418, e.g., to read from or write to removable disk 420, and an optical disk drive 422, e.g., for reading CD-ROM disk 424 or to read from or write to other optical media. Hard disk drive 416, magnetic disk drive 418, and optical disk drive 422 are connected to system bus 406 by a hard disk drive interface 426, a magnetic disk drive interface 428, and an optical drive interface 430, respectively. The drives and associated computer-readable media provide nonvolatile storage of data, data structures, and computer-executable instructions for computer system 400. Although the description of computer-readable media above refers to a hard disk, a removable magnetic disk, and a CD, other types of media that are readable by a computer, such as magnetic cassettes, flash memory cards, digital video disks, and the like, in a variety of forms, may also be used in the operating environment; further, any such media may contain computer-executable instructions for implementing one or more parts of embodiments shown and described herein.

A number of program modules may be stored in drives and RAM 412, including operating system 432, one or more application programs 434, other program modules 436, and program data 438. In some examples, the application programs 434 can include a control scheme (e.g., control scheme 300 of FIG. 3), and the program data 438 can include salinity values (e.g., from TDS sensors 130$s$, 116$s$, 140$s$, 170$s$ of FIG. 1) and/or one or more reservoir factors (e.g., reservoir factors 305 of FIG. 3). The application programs 434 and program data 438 can include functions and methods programmed to optimize aqueous flooding fluid composition and flow, such as shown and described herein.

A user may enter commands and information into computer system 400 through one or more input devices 440, such as a pointing device (e.g., a mouse, touch screen), keyboard, microphone, joystick, game pad, scanner, and the like. For instance, the user can employ input device 440 to edit or modify the one or more reservoir factors based on available data (e.g., reference data, laboratory testing, sensor data, the like, or any combination thereof). These and other input devices 440 are often connected to processing unit 402 through a corresponding port interface 442 that is coupled to the system bus, but may be connected by other interfaces, such as a parallel port, serial port, or universal serial bus (USB). One or more output devices 444 (e.g., display, monitor, printer, projector, or other type of displaying device) is also connected to system bus 406 via interface 446, such as a video adapter.

Computer system 400 may operate in a networked environment using logical connections to one or more remote computers, such as remote computer 448. Remote computer 448 may be a workstation, computer system, router, peer device, or other common network node, and typically includes many or all of the elements described relative to computer system 400. The logical connections, schematically indicated at 450, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 400 can be connected to the local network through a network interface or adapter 452. When used in a WAN networking environment, computer system 400 can include a modem, or can be connected to a communications server on the LAN. The modem, which may be internal or external, can be connected to system bus 406 via an appropriate port interface. In a networked environment, application programs 434 or program data 438 depicted relative to computer system 400, or portions thereof, may be stored in a remote memory storage device 454.

Additional embodiments disclosed herein include:

Embodiment 1. A method comprising: desalinating, at least partially, a first portion of a saline aqueous fluid through a reverse osmosis system to produce a desalinated aqueous fluid; mixing the desalinated aqueous fluid with a second portion of the saline aqueous fluid at a first ratio to produce an aqueous flooding fluid; and introducing the aqueous flooding fluid to a subterranean reservoir.

Embodiment 2. The method of Embodiment 1, wherein the subterranean reservoir comprises a carbonate reservoir.

Embodiment 3. The method of Embodiment 1 or 2, wherein the first ratio is based on a reservoir factor of the subterranean reservoir.

Embodiment 4. The method of any one of Embodiments 1-3, wherein the reservoir factor comprises: mineralogical content, temperature, pressure, formation wettability, minimum fracture pressure, formation layers, or any combination thereof.

Embodiment 5. The method of any one of Embodiments 1-4, further comprising: mobilizing a hydrocarbon in the subterranean reservoir toward a production well; and producing at least a portion of each of the hydrocarbons from the production well.

Embodiment 6. The method of any one of Embodiments 1-5, further comprising: measuring a reservoir factor of the subterranean reservoir; and wherein the first ratio is based on the saturation factor of the subterranean reservoir.

Embodiment 7. The method of any one of Embodiments 1-6, further comprising: measuring a first salinity of the saline aqueous fluid; and measuring a second salinity of the desalinated aqueous fluid; wherein the first ratio is based on the first salinity and the second salinity.

Embodiment 8. The method of any one of Embodiments 1-7, further comprising: measuring an online salinity of the aqueous flooding fluid; and adjusting the first ratio based on the online salinity.

Embodiment 9. The method of any one of Embodiments 1-8, wherein the saline aqueous fluid comprises seawater.

Embodiment 10. The method of any one of Embodiments 1-9, further comprising: mixing produced aqueous fluid with the desalinated fluid and the second portion of the saline aqueous fluid to produce the aqueous flooding fluid.

Embodiment 11. The method of any one of Embodiments 1-10, wherein introducing the aqueous flooding fluid to a subterranean reservoir comprises: directing a first portion of aqueous flooding fluid through a first delivery choke valve and to a first injection well; directing a second portion of aqueous flooding fluid through a second delivery choke valve and to a second injection well; introducing the first portion of aqueous flooding fluid; and mobilizing a hydrocarbon in proximity of the first injection well and/or the second injection well toward a production well.

Embodiment 12. The method of any one of Embodiments 1-11, wherein the reverse osmosis system comprises a mobile reverse osmosis system.

Embodiment 13. The method of any one of Embodiments 1-12, wherein the aqueous flooding fluid comprises total dissolved solids (TDS) of about 6,000 ppm to about 10,000 ppm.

Embodiment 14. The method of any one of Embodiments 1-13, wherein the saline aqueous fluid comprises total dissolved solids (TDS) of about 10,000 ppm to about 30,000 ppm.

Embodiment 15. A system comprising: an inline mixer; a reverse osmosis unit fluidly connected to the inline mixer, wherein the reverse osmosis unit produces desalinated aqueous fluid from saline aqueous fluid, and wherein the inline mixer combines the desalinated aqueous fluid and the saline aqueous fluid at a first ratio to produced aqueous flooding fluid; a first injection well fluidly connected to the inline mixer, wherein the first injection well introduces a first portion of the aqueous flooding fluid to a subterranean reservoir; a first TDS sensor, wherein the first TDS sensor measures a first salinity of the desalinated aqueous fluid, and wherein the first TDS sensor is in communication with a controller; a second TDS sensor, wherein the second TDS sensor measures a second salinity of the saline aqueous fluid, and wherein the second TDS sensor is in communication with the controller; a fourth TDS sensor, wherein the fourth TDS sensor measures an online salinity of the aqueous flooding fluid, and wherein the fourth TDS sensor is in communication with the controller; a first inflow choke valve, wherein the first inflow choke valve is configured to regulate a flow of the desalinated aqueous fluid to the inline mixer, and wherein the first inflow choke valve is in communication with the controller; and a second inflow choke valve, wherein the second inflow choke valve is configured to regulate a flow of the saline aqueous fluid to the inline mixer, and wherein the second inflow choke valve is in communication with the controller.

Embodiment 16. The system of Embodiment 15, wherein the controller is configured to regulate the first ratio based on the first salinity, the second salinity, the online salinity, or any combination thereof.

Embodiment 17. The system of Embodiment 15 or 16, further comprising: a second injection well fluidly connected to the inline mixer, wherein the second injection well introduces a second portion of the aqueous flooding fluid to the subterranean reservoir.

Embodiment 18. The system of any one of claims 15-17, further comprising: a production well, wherein the production well is configured to extract hydrocarbons from the subterranean reservoir, wherein the hydrocarbons are mobilized by the aqueous flooding fluid.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized that these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
desalinating, at least partially, a first portion of a saline aqueous fluid through a reverse osmosis system to produce a desalinated aqueous fluid;
measuring a first salinity of the desalinated aqueous fluid via a first total dissolved solids (TDS) sensor in communication with a controller;
measuring a second salinity of the saline aqueous fluid via a second TDS sensor in communication with the controller;
mixing the desalinated aqueous fluid with a second portion of the saline aqueous fluid at a first ratio based on the first salinity and the second salinity via an inline mixer fluidly connected to the reverse osmosis system to produce an aqueous flooding fluid, wherein mixing the desalinated aqueous fluid with the second portion of the saline aqueous fluid comprises:
regulating a flow of the desalinated aqueous fluid to the inline mixer via a first inflow choke valve in communication with the controller;
and
regulating a flow of the saline aqueous fluid to the inline mixer via a second inflow choke valve in communication with the controller;
measuring an online salinity of the aqueous flooding fluid via a fourth TDS sensor in communication with the controller; and
introducing the aqueous flooding fluid to a subterranean reservoir, wherein introducing the aqueous flooding fluid to a subterranean reservoir comprises:
introducing a first portion of the aqueous flooding fluid to the subterranean reservoir via a first injection well fluidly connected to the inline mixer.

2. The method of claim 1, wherein the subterranean reservoir comprises a carbonate reservoir.

3. The method of claim 1, wherein the first ratio is based on a reservoir factor of the subterranean reservoir.

4. The method of claim 1, wherein the reservoir factor comprises:
mineralogical content, temperature, pressure, formation wettability, minimum fracture pressure, formation layers, or any combination thereof.

5. The method of claim 1, further comprising:
mobilizing a hydrocarbon in the subterranean reservoir toward a production well; and
producing at least a portion of each of the hydrocarbons from the production well.

6. The method of claim 1, further comprising:
measuring a reservoir factor of the subterranean reservoir; and wherein the first ratio is based on the saturation factor of the subterranean reservoir.

7. The method of claim 1, wherein the saline aqueous fluid comprises seawater.

8. The method of claim 1, further comprising:
mixing produced aqueous fluid with the desalinated fluid and the second portion of the saline aqueous fluid to produce the aqueous flooding fluid.

9. The method of claim 8, wherein mixing the produced aqueous fluid with the desalinated fluid and the second portion of the saline aqueous fluid to produce the aqueous flooding fluid comprises:
regulating a flow of the desalinated aqueous fluid to the inline mixer via a first inflow choke valve in communication with the controller;
regulating a flow of the saline aqueous fluid to the inline mixer via a second inflow choke valve in communication with the controller; and
regulating a flow of the produced aqueous fluid to the inline mixer via a third inflow choke valve in communication with the controller.

10. The method of claim 1, wherein introducing the aqueous flooding fluid to a subterranean reservoir comprises:
directing the first portion of the aqueous flooding fluid through a first delivery choke valve and to the first injection well;
directing a second portion of the aqueous flooding fluid through a second delivery choke valve and to a second injection well fluidly connected to the inline mixer;
introducing the first portion and/or the second portion of the aqueous flooding fluid; and
mobilizing a hydrocarbon in proximity of the first injection well and/or the second injection well toward a production well.

11. The method of claim 1, wherein the reverse osmosis system comprises a mobile reverse osmosis system.

12. The method of claim 1, wherein the aqueous flooding fluid comprises total dissolved solids (TDS) of about 6,000 ppm to about 10,000 ppm.

13. The method of claim 1, wherein the saline aqueous fluid comprises total dissolved solids (TDS) of about 10,000 ppm to about 30,000 ppm.

14. The method of claim 1, wherein the controller is configured to regulate the first ratio based on the first salinity, the second salinity, the online salinity, or any combination thereof.

15. A system comprising:
an inline mixer;
a reverse osmosis unit fluidly connected to the inline mixer, wherein the reverse osmosis unit produces desalinated aqueous fluid from saline aqueous fluid, and wherein the inline mixer combines the desalinated aqueous fluid and the saline aqueous fluid at a first ratio to produce aqueous flooding fluid;
a first injection well fluidly connected to the inline mixer, wherein the first injection well introduces a first portion of the aqueous flooding fluid to a subterranean reservoir;

a first total dissolved solids (TDS) sensor, wherein the first TDS sensor measures a first salinity of the desalinated aqueous fluid, and wherein the first TDS sensor is in communication with a controller;
a second TDS sensor, wherein the second TDS sensor measures a second salinity of the saline aqueous fluid, and wherein the second TDS sensor is in communication with the controller;
a fourth TDS sensor, wherein the fourth TDS sensor measures an online salinity of the aqueous flooding fluid, and wherein the fourth TDS sensor is in communication with the controller;
a first inflow choke valve, wherein the first inflow choke valve is configured to regulate a flow of the desalinated aqueous fluid to the inline mixer, and wherein the first inflow choke valve is in communication with the controller; and
a second inflow choke valve, wherein the second inflow choke valve is configured to regulate a flow of the saline aqueous fluid to the inline mixer, and wherein the second inflow choke valve is in communication with the controller.

16. The system of claim 15, wherein the controller is configured to regulate the first ratio based on the first salinity, the second salinity, the online salinity, or any combination thereof.

17. The system of claim 15, further comprising:
a second injection well fluidly connected to the inline mixer, wherein the second injection well introduces a second portion of the aqueous flooding fluid to the subterranean reservoir.

18. The system of claim 17, further comprising:
a first delivery choke valve in communication with the controller, wherein the first delivery choke valve is configured to regulate the flow of the first portion of the aqueous flooding fluid to the first injection well; and
a second delivery choke valve in communication with the controller, wherein the second delivery choke valve is configured to regulate the flow of the second portion of the aqueous flooding fluid to the second injection well.

19. The system of claim 15, further comprising:
a production well, wherein the production well is configured to extract hydrocarbons from the subterranean reservoir, wherein the hydrocarbons are mobilized by the aqueous flooding fluid.

20. The system of claim 15, further comprising:
a third inflow choke valve, wherein the third inflow choke valve is configured to regulate a flow of produced aqueous fluid to the inline mixer, wherein the third inflow choke valve is in communication with the controller, and wherein the inline mixer combines the produced aqueous fluid with the desalinated aqueous fluid and the saline aqueous fluid to produce the aqueous flooding fluid.

* * * * *